US012524527B2

(12) United States Patent
Salonidis et al.

(10) Patent No.: US 12,524,527 B2
(45) Date of Patent: Jan. 13, 2026

(54) BYZANTINE-RESILIENT BILEVEL FEDERATED LEARNING

(71) Applicants: International Business Machines Corporation, Armonk, NY (US); Rensselaer Polytechnic Institute, Troy, NY (US)

(72) Inventors: Theodoros Salonidis, Wayne, PA (US); Yi Zhou, San Jose, CA (US); Momin Abbas, New York, NY (US); Parikshit Ram, Atlanta, GA (US); Nathalie Baracaldo Angel, San Jose, CA (US); Horst Cornelius Samulowitz, Armonk, NY (US); Tianyi Chen, Rensselaer, NY (US)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 42 days.

(21) Appl. No.: 18/595,386

(22) Filed: Mar. 4, 2024

(65) Prior Publication Data
US 2025/0278474 A1    Sep. 4, 2025

(51) Int. Cl.
*G06F 21/55* (2013.01)
(52) U.S. Cl.
CPC .................................. *G06F 21/55* (2013.01)
(58) Field of Classification Search
None
See application file for complete search history.

(56) References Cited

U.S. PATENT DOCUMENTS

| 2022/0156574 A1* | 5/2022 | Anwar ................... G06N 20/00 |
| 2022/0292387 A1 | 9/2022 | Zhou et al. |

(Continued)

FOREIGN PATENT DOCUMENTS

| CN | 111598143 A | 8/2020 |
| CN | 113313266 A | 8/2021 |

(Continued)

OTHER PUBLICATIONS

Ataee et al. Fednest: Federated bilevel, minimax, and compositional optimization, arXiv:2205.02215v3 [cs.LG], Sep. 13, 2022, 34 pages.

(Continued)

*Primary Examiner* — Nelson S. Giddins
(74) *Attorney, Agent, or Firm* — Steven Bouknight; Otterstedt & Kammer PLLC

(57) ABSTRACT

An intermediate global lower-level machine learning model is generated by executing federated learning model training using data from an identified first set of lower-level non-Byzantine client computers which are characterized as being non-Byzantine for the lower-level system. A global lower-level machine learning model is generated by executing the federated learning model training using data from an identified second lower-level set of non-Byzantine client computers which are characterized as being non-Byzantine for the lower-level system. An intermediate global upper-level machine learning model is generated by executing the federated learning model training using data from an identified first upper-level set of non-Byzantine client computers which are characterized as being non-Byzantine for an upper-level system. A global upper-level machine learning model is generated by executing the federated learning model training using data from a second upper-level set of client computers which are characterized as being non-Byzantine for the upper-level system.

20 Claims, 10 Drawing Sheets

FIG. 2

(56) References Cited

U.S. PATENT DOCUMENTS

| | | | | |
|---|---|---|---|---|
| 2024/0111903 | A1* | 4/2024 | Moran | G06F 21/64 |
| 2025/0055864 | A1* | 2/2025 | Ferreira | H04L 63/1425 |

FOREIGN PATENT DOCUMENTS

| | | |
|---|---|---|
| CN | 113704807 A | 11/2021 |
| CN | 113779615 A | 12/2021 |
| CN | 115187783 A | 10/2022 |
| CN | 115392348 A | 11/2022 |
| TW | 1769531 B | 7/2022 |

OTHER PUBLICATIONS

Bao et al. "Stability and Generalization of Bilevel Programming in Hyperparameter Optimization", arXiv:2106.04188v2 [cs.LG], Oct. 23, 2021, 30 pages.

Blanchard et al. Machine learning with adversaries: Byzantine tolerant gradient descent, NeurIPS Proceedings, Dec. 4, 2017, 11 pages.

Borsos et al. "Coresets Via Bilevel Optimization for Continual Learning and Streaming", Advances in Neural Information Processing Systems, Jun. 6, 2020, pp. 14879-14890, vol. 33.

Bracken et al. "Mathematical programs with optimization problems in the constraints", Operations Research, Feb. 1973, pp. 37-44, vol. 21, No. 1.

Chen et al. "A single-timescale stochastic bilevel optimization method", arXiv:2102.04671v1 [math.OC], Feb. 9, 2021, 27 pages.

Chen et al. "Closing the Gap: Tighter Analysis of Alternating Stochastic Gradient Methods for Bilevel Problems", Advances in Neural Information Processing Systems 34 (NeurIPS 2021), Jun. 25, 2021, 14 pages.

Chen et al. "Distributed statistical machine learning in adversarial settings: Byzantine gradient descent", Proceedings of the ACM on Measurement and Analysis of Computing Systems, 2017, pp. 1-25, vol. 1, No. 2.

Chen et al. Decentralized bilevel optimization, arXiv:2206.05670v1 [math.OC], Jun. 12, 2022, 40 pages.

Colson et al. "An overview of bilevel optimization", Annals of Operations Research, Apr. 20, 2007, pp. 235-256, vol. 153, No. 1.

Dempe et al. "Bilevel Optimization", Springer, 2020, 679 pages, vol. 161.

Franceschi et al. "Bilevel programming for hyperparameter optimization and meta-learning", International Conference on Machine Learning, Jul. 3, 2018, 12 pages.

Gao et al. Stochastic bilevel distributed optimization over a network, arXiv:2206.15025v1 [cs.LG], Jun. 30, 2022, 11 pages.

Ghadimi et al. "A single timescale stochastic approximation method for nested stochastic optimization", SIAM Journal on Optimization, 2020, pp. 960-979, vol. 30, No. 1.

Ghadimi et al. "Approximation Methods for Bilevel Programming", arXiv:1802.02246 [math.OC], Feb. 6, 2018, 27 pages.

Gorbunov et al. Secure distributed training at scale, arXiv:2106.11257v4 [cs.LG], Jan. 2, 2023, 61 pages.

Grazzi et al. On the iteration complexity of hypergradient computation, arXiv:2006.16218v2 [stat.ML], Jul. 10, 2020, 19 pages.

Hong et al. "A two-timescale framework for bilevel optimization: Complexity analysis and application to actor-critic", arXiv preprint, arXiv:2007.05170, Jul. 10, 2020, 53 pages.

Ji et al. "Provably faster algorithms for bilevel optimization and applications to meta-learning", Oct. 15, 2020, 30 pages.

Karimireddy et al. "Byzantine-robust learning on heterogeneous datasets via bucketing", ICLR 2022 Spotlight, Jan. 29, 2022, 13 pages.

Karimireddy et al. Learning from history for byzantine robust optimization, arXiv:2012.10333v3 [cs.LG], Jun. 29, 2021, 26 pages.

Khanduri, et al. "A near-optimal algorithm for stochastic bilevel optimization via double-momentum", arXiv:2102.07367v3 [math.OC], Jun. 15, 2021, 36 pages.

Konda et al. "Actor-critic-type learning algorithms for Markov decision processes", SIAM Journal on Control and Optimization, 1999, pp. 94-123, vol. 38, No. 1.

Kunapuli et al. "Classification model selection via bilevel programming", Optimization Methods & Software, Jul. 11, 2008, pp. 475-489, vol. 23.

Lamport et al. "The Byzantine Generals Problem", Association for Computing Machinery, Oct. 2019, pp. 203-226. ISBN 9781450372701, https://doi.org/10.1145/3335772.3335936.

Li et al. "A fully single loop algorithm for bilevel optimization without hessian inverse", Proceedings of the AAAI Conference on Artificial Intelligence, 2022, pp. 7426-7434.

Li et al. "RSA: Byzantine-robust stochastic aggregation methods for distributed learning from heterogeneous datasets", Proceedings of the AAAI Conference on Artificial Intelligence, Jan. 27, 2019, pp. 1544-1551, vol. 33.

Liu et al. "DARTS: Differentiable architecture search", arXiv preprint, arXiv: 1806.09055, Jun. 24, 2018, 12 pages.

Liu et al. Investigating bi-level optimization for learning and vision from a unified perspective: A survey and beyond, arXiv:2101.11517v3 [cs.LG], Sep. 28, 2021, 23 pages.

Lu et al. Decentralized bilevel optimization for personalized client learning, IEEE, May 2022, 5 pages.

Madry et al. "Towards deep learning models resistant to adversarial attacks", arXiv preprint, arXiv: 1706.06083, Jun. 19, 2017, 22 pages.

Mhamdi et al. The hidden vulnerability of distributed learning in Byzantium, arXiv: 1802.07927v2 [stat. ML], Jul. 17, 2018, 13 pages.

Pedregosa et al. "Hyperparameter optimization with approximate gradient", International Conference on Machine Learning, Feb. 7, 2016, 14 pages.

Pedregosa Fabian, Hyperparameter optimization with approximate gradient, arXiv:1602.02355v6 [stat. ML], Nov. 21, 2022, 15 pages.

Peng et al. "Byzantine-robust variance-reduced federated learning over distributed non-IID data", arXiv preprint, arXiv:2009.08161, Sep. 17, 2020, 17 pages.

Rajeswaran et al. "Meta-learning with implicit gradients", Advances in Neural Information Processing Systems, Sep. 10, 2019, 18 pages.

Shaban et al. Truncated back-propagation for bilevel optimization, arXiv: 1810.10667v2 [cs.LG], Apr. 5, 2019, 20 pages.

Sinha et al. "A review on bilevel optimization: from classical to evolutionary approaches and applications", IEEE Transactions on Evolutionary Computation, May 17, 2017, pp. 276-295, vol. 22, No. 2.

Varma et al. "Legato: A layerwise gradient aggregation algorithm for mitigating Byzantine attacks in federated learning", 2021 IEEE 14th International Conference on Cloud Computing (CLOUD), 2021, pp. 272-277. IEEE.

Vicente et al. "Bilevel and multilevel programming: A bibliography review", Journal of Global Optimization, Oct. 1, 1994, pp. 291-306, vol. 5, No. 3.

Xia et al. "FABA: An algorithm for fast aggregation against Byzantine attacks in distributed neural networks", Proceedings of the 28th International Joint Conference on Artificial Intelligence (IJCAI'19), Aug. 1, 2019, pp. 4824-4830.

Xie et al. "PHOCAS: Dimensional Byzantine-resilient stochastic gradient descent", arXiv preprint, arXiv: 1805.09682, May 23, 2018, 24 pages.

Yang et al. Decentralized gossip-based stochastic bilevel optimization over communication networks, arXiv:2206.10870v1 [stat.ML, ], Jun. 22, 2022, 32 pages.

Yin et al. Byzantine-robust distributed learning: Towards optimal statistical rates, arXiv: 1803.01498v2 [cs.LG], Feb. 25, 2021, 33 pages.

Zhao et al. "Federated learning with non-IID data", arXiv preprint, arXiv: 1806.00582, Jun. 2, 2018, 13 pages.

* cited by examiner

Algorithm 1 BILANTINE

Input: $K, T \in \mathbb{N}^+$; $x^0, y^0$, stepsizes $\{(\alpha^k, \beta^k)\}_{k=0}^{K-1}$,
assumed ratio of upper/lower Byzantine clients: $\eta_u, \eta_l$
for k = 0,...,K - 1 do
    $y^{k,0} = y^k$
    for $t$ = 0,...,T - 1 do
        $y^{k,t+1}$ = BYZIN($x^k, y^{k,t}, \beta^k, \eta_l$)
    end for
    $y^{k+1} = y^{k,T}$
    $x^{k+1}$ = BYZOUT($x^k, y^{k+1}, \alpha^k, \eta_u$)
end for

FIG. 3

Algorithm 2 : $x^+$ = BYZOUT($x, y^+, \alpha, \eta_u$).

Initialize: $\alpha_j \in (0, \alpha]$
Select $R \in \mathbb{N}$ and set $P_R$ = InvHG($x, y^+, R$)
for all clients $i \in \mathcal{N}$ in parallel do
    Compute $h_i = h_i(x, y^+)$ via (7)
end for
$\bar{h}$ = RES($\{h_1, ..., h_N\}, \eta_u$)
for all clients $i \in \mathcal{N}$ in parallel do
    for $v$ = 0,...,$\tau_i$ - 1 do         ▷ Set $x_{i,0} = x$
        $h_{i,v} = \nabla_x f_i(x_{i,v}^k; \xi_{i,v}) - \nabla_x f_i(x; \xi_{i,v}) + \bar{h}$
        $x_{i,v+1} = x_{i,v} - \alpha_i h_{i,v}$
    end for
end for
$x^+$ = RES($\{(x_{1,\tau_1}), ..., (x_{N,\tau_N})\}, \eta_u$)

FIG. 4

Algorithm 3: $y^+ = \text{BYZIN}(x,y,\beta,\eta_l)$.

Initialize: $\beta_j \in (0,\beta]$
for all clients $i \in \mathcal{N}$ in parallel do
    $q_i = \nabla_y g_i(x, y; \zeta_i)$
end for
$\bar{q} = \text{RES}(\{q_1,..., q_N\}, \eta_l)$
for all clients $i \in \mathcal{N}$ in parallel do
    for $v = 0,...,\tau_i - 1$ do     ▷ Set $y_{i,0} = y$
        $q_{i,v} = \nabla_y g_i(x,y_{i,v}; \zeta_{i,v}) - \nabla_y g_i(x,y; \zeta_i) + \bar{q}$
        $y_{i,v+1} = y_{i,v} - \alpha_i q_{i,v}$
    end for
end for
$y^+ = \text{RES}(\{(y_{1,\tau_1}),..., (y_{N,\tau_N})\}, \eta_l)$

FIG. 5

Algorithm 4: $p_{R'} = \text{InvHG}(x,y^+, R)$.

Select $R' \in \{0,...,R\}$ and $\mathcal{N}_0 \in \mathcal{N}$ UAR
    for all $i \in \mathcal{N}_0$ in parallel do
        $p_{i,0} = \nabla_y f_i(x, y^+; \xi_{i,0})$
    end for
$p_0 = \dfrac{R}{l_{g,1}} |\mathcal{N}_0|^{-1} \Sigma_{i \in \mathcal{N}_0} p_{i,0}$
if $R' = 0$ then
    return $p_{R'}$
end if
    Select $\mathcal{N}_1,..., \mathcal{N}_{R'} \in \mathcal{N}$ UAR.
for all $r = 1,..., R'$ do
    for $i \in \mathcal{N}_r$ in parallel do
        $p_{i,r} = (I - \dfrac{1}{l_{g,1}} \nabla_y^2 g_i(x, y^+; \zeta_{i,r})) p_{r-1}$
    end for
    $p_r = |\mathcal{N}_r|^{-1} \Sigma_{i \in \mathcal{N}_r} p_{i,r}$
end for

FIG. 6

Algorithm 5 $g^+ = \text{RES}(G, \eta_x)$.

Input: $G = \{G_1, ..., G_N\}, \eta_x$
Initialize: $j = 1$
while $j < \eta_x N$ do
    $G_j = |G|$
    Compute $g^{av} = \frac{1}{G_j} \Sigma_{i=1}^{G_j} G_i$
    Compute $G^* = \{(G_1 - g^{av}), ..., (G_{G_j} - g^{av})\}$
    $a = \arg\max G^*$
    Compute $G = G \backslash G_a$
    $j = j + 1$
end while
    $g^+ = (N - [\eta_x N])^{-1} \Sigma_{i=1}^{N-[\eta_x N]} G_i$

*FIG. 7*

(a) Attacking Different Levels (B=1)

(b) Defending Different Levels (B=3)

(c) Defense Performance (a) Gaussian Attack (b) Sign-Flipping Attack (c) Result on Non-iid Data (a) Varying B (b) Varying $\eta_u, \eta_l$ (c) Varying $C_{out}$

BYZANTINE-RESILIENT BILEVEL FEDERATED LEARNING

BACKGROUND

The present invention relates generally to the electrical, electronic and computer arts and, more particularly, to machine learning.

Federated Learning (FL) is a distributed machine learning (ML) paradigm where a global model is trained from data distributed at multiple client sites, without sharing the raw data of the clients. The global model is trained through an iterative procedure where clients train local models, send their parameters to a server for aggregation, and the server sends the aggregated model parameters to the clients, which train local models from the received aggregated model parameters in the next iteration.

Byzantine attacks are, however, an important threat to federated learning (FL) systems and may result in poor quality models and slow convergence. In general, a Byzantine attack in federated learning is an attack where at least one participant in the federated learning is a malicious participant who, for example, is attempting to inappropriately obtain information from other participants, impair the performance of the federated learning, and the like. While these attacks have been widely studied in single-level optimization problems, they are not well understood in bilevel optimization.

BRIEF SUMMARY

Principles of the invention provide systems and techniques for Byzantine-resilient bilevel federated learning. In one aspect, an exemplary method includes the operations of receiving, by an aggregator, updated parameters associated with a lower-level system from a plurality of client computers; generating, using data from an identified first set of lower-level non-Byzantine client computers, of the plurality of client computers, which are characterized as being non-Byzantine for the lower-level system, an intermediate global lower-level machine learning model by executing federated learning model training and aggregation; generating, using data from an identified second lower-level set of non-Byzantine client computers, of the plurality of client computers, which are characterized as being non-Byzantine for the lower-level system, a global lower-level machine learning model by executing the federated learning model training and aggregation; generating, using data from an identified first upper-level set of non-Byzantine client computers, of the plurality of client computers, which are characterized as being non-Byzantine for an upper-level system, an intermediate global upper-level machine learning model by executing the federated learning model training and aggregation; generating, using data from a second upper-level set of client computers, of the plurality of client computers, which are characterized as being non-Byzantine for the upper-level system, a global upper-level machine learning model by executing the federated learning model training and aggregation; and transmitting, by the aggregator, the global upper-level machine learning model to at least one of the plurality of client computers.

In one aspect, a computer program product comprises one or more tangible computer-readable storage media and program instructions stored on at least one of the one or more tangible computer-readable storage media, the program instructions executable by a processor, the program instructions comprising receiving, by an aggregator, updated parameters associated with a lower-level system from a plurality of client computers; generating, using data from an identified first set of lower-level non-Byzantine client computers, of the plurality of client computers, which are characterized as being non-Byzantine for the lower-level system, an intermediate global lower-level machine learning model by executing federated learning model training and aggregation; generating, using data from an identified second lower-level set of non-Byzantine client computers, of the plurality of client computers, which are characterized as being non-Byzantine for the lower-level system, a global lower-level machine learning model by executing the federated learning model training and aggregation; generating, using data from an identified first upper-level set of non-Byzantine client computers, of the plurality of client computers, which are characterized as being non-Byzantine for an upper-level system, an intermediate global upper-level machine learning model by executing the federated learning model training and aggregation; generating, using data from a second upper-level set of client computers, of the plurality of client computers, which are characterized as being non-Byzantine for the upper-level system, a global upper-level machine learning model by executing the federated learning model training and aggregation; and transmitting, by the aggregator, the global upper-level machine learning model to at least one of the plurality of client computers.

In one aspect, an apparatus comprises a memory and at least one processor, coupled to the memory, and operative to perform operations comprising receiving, by an aggregator, updated parameters associated with a lower-level system from a plurality of client computers; generating, using data from an identified first set of lower-level non-Byzantine client computers, of the plurality of client computers, which are characterized as being non-Byzantine for the lower-level system, an intermediate global lower-level machine learning model by executing federated learning model training and aggregation; generating, using data from an identified second lower-level set of non-Byzantine client computers, of the plurality of client computers, which are characterized as being non-Byzantine for the lower-level system, a global lower-level machine learning model by executing the federated learning model training and aggregation; generating, using data from an identified first upper-level set of non-Byzantine client computers, of the plurality of client computers, which are characterized as being non-Byzantine for an upper-level system, an intermediate global upper-level machine learning model by executing the federated learning model training and aggregation; generating, using data from a second upper-level set of client computers, of the plurality of client computers, which are characterized as being non-Byzantine for the upper-level system, a global upper-level machine learning model by executing the federated learning model training and aggregation; and transmitting, by the aggregator, the global upper-level machine learning model to at least one of the plurality of client computers.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:
- improvements to the technical field of machine learning using a Byzantine-resilient bilevel approach to mitigate Byzantine attacks, even under adaptive attacks where the adversary explicitly targets the bilevel optimization;
- efficient defense against Byzantine attacks in the bilevel FL setting by adaptively tuning the performance based on the number of Byzantine clients;
- efficient defense against Byzantine attacks in the bilevel FL setting for use cases such as federal hyperparameter optimization; and
- exemplary embodiments match the performance of the conventional non-federated, non-Byzantine bilevel methods as well as the conventional federated, non-Byzantine bilevel methods, despite the challenges incurred due to the Byzantine attacks.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 3 is an example algorithm (Algorithm 1) for the Byzantine-resilient federated bilevel algorithm (BILANTINE), in accordance with an example embodiment;

FIG. 4 is an example subroutine algorithm (Algorithm 2, BYZIN) for a Byzantine-resilient gradient-based optimizer involving local steps for the Byzantine-resilient federated bilevel algorithm, in accordance with an example embodiment;

FIG. 5 is an example subroutine algorithm (Algorithm 3, BYZOUT) for a Byzantine-resilient gradient-based optimizer involving local steps for the Byzantine-resilient federated bilevel algorithm, in accordance with an example embodiment;

FIG. 6 is an example algorithm for computing the Hessian inverse, in accordance with an example embodiment;

FIG. 7 is an example algorithm (Algorithm 5) for the seminal component for both subroutines which provides resilience against Byzantine clients by adaptively removing the outliers in accordance with an example embodiment;

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Figure 1:
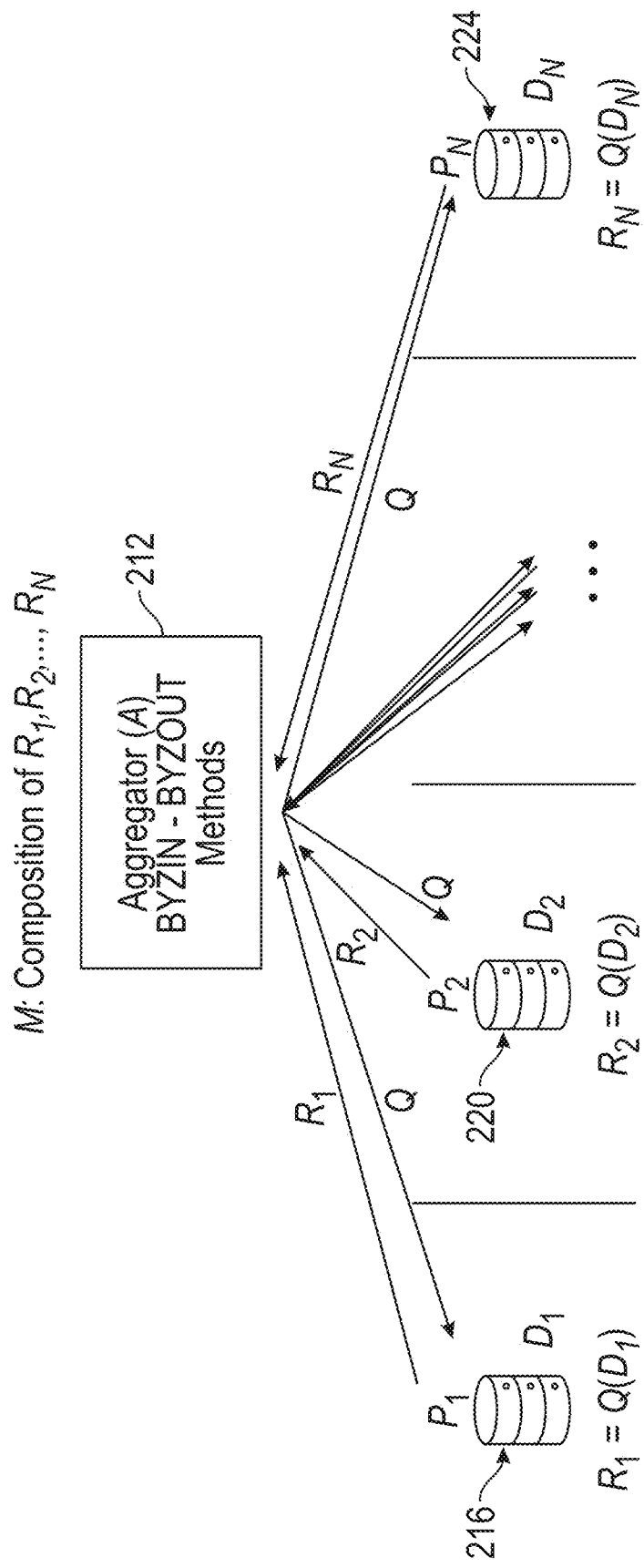
FIG. 1 is a high-level diagram of a federated learning system.

FIG. 1 is a high-level diagram of a federated learning system. Federated learning systems generally include an aggregator server 212 and multiple clients 216, 220, 224 who seek to train a global model based on their private local datasets $D_1, D_2, \ldots, D_N$. The aggregator server 212 that monitors the federated learning process issues queries to clients 216, 220, 224, collects responses from clients 216, 220, 224 and aggregates the collected responses to update the global model M. (In FIG. 1, Q represents a query issued by the aggregator server 212 to learn a global predictive model M.) Given the current weight (model parameter), gradients and new model parameters are requested. Information about a specific label (class), class counts, and the like are also requested. P represents clients (participants) 216, 220, 224 ($P_1, P_2, \ldots, P_N$ where $P_i$ is the $i^{th}$ client that respond to aggregator queries; each client responds based on its local dataset $D_1, D_2, \ldots, D_N$ (generally $D_i$ is the data for the $i^{th}$ client). The responses are denoted $R_1, R_2, \ldots, R_N$.

Federated learning typically assumes a single level of optimization, where the objective is to minimize the training loss of the global model. New machine learning applications (hyperparameter optimization (HPO), data heterogeneity, and the like) require more than just training a model. In this case, bilevel FL is used, where the optimization is split between two hierarchical objectives, with the lower-level optimization specific to the model training, and the upper-level optimization specific to a second objective, such as robustness to distribution shifts, fast adaptation, and automation.

To tackle emerging learning requirements and challenges, such as robustness and automation, many machine learning problems today involve nested structures, and are thus often formulated as bilevel learning problems. In one example embodiment, bilevel learning in the federated setting and in the presence of Byzantine clients is considered, and a Byzantine-resilient bilevel federated optimization algorithm (referred to as BILANTINE herein) and a corresponding theoretical analysis establishing its convergence rate are disclosed. The performance of an exemplary embodiment was empirically evaluated on a data reweighting task under several attacks to show the efficacy of the exemplary embodiment. It is shown that the exemplary embodiment can nearly achieve the same performance as would be achieved without any attack under several settings.

Generally, federated learning (FL) is a distributed machine learning (ML) paradigm where a global model is trained from data distributed at multiple client sites 216, 220, 224, without sharing of the clients' raw data. The global model is trained through an iterative procedure where clients 216, 220, 224 train local models, send their parameters to the aggregator server 212 for aggregation and the aggregator server 212 sends the aggregated model parameters to the clients 216, 220, 224 which train local models from the received aggregated model parameters in the next iteration. Most existing works in FL focus on the single-level problem of training a global model from distributed data. However, emerging FL applications may require ML training tasks with additional learning criteria beyond just training a global model, such as robustness to imbalanced heterogeneous data and distribution shifts, fast adaptation, and automation. Such criteria can be captured with bi-level learning problem formulations where the upper-level solution to the training problem depends on the lower-level solution to the problem that is reflecting the additional learning criteria. Indeed, many ML tasks today admit a bilevel structure including meta-learning, reinforcement learning, hyperparameter optimization, adversarial learning, neural architecture search and continual learning. However, bilevel learning problems have been primarily studied in non-FL settings where all data is available at a central location.

In example embodiments, the problem of combating Byzantine attacks in bilevel FL is addressed. Byzantine attacks are generally due to clients 216, 220, 224 being compromised by malicious hackers or client hardware/software malfunctions, which inject dubious data into the FL training process and severely affect the resulting global model performance. To overcome this challenge, a series of robust aggregation algorithms have been proposed in the single-level FL setting. The bilevel FL structure, however, poses new challenges in the discovery of efficient Byzantine-resilient methods and their analysis. These challenges are partially due to the nested (i.e., bilevel) structure of the problem, where the solution of the upper-level problem depends on the solution of the lower-level problem, making it difficult to decipher which approach would optimally defend each level.

Generally, an efficient method to defend against Byzantine attacks in bilevel FL is disclosed. More specifically, a technique entitled "BILANTINE," the first Byzantine-resilient algorithm for bilevel federated optimization is disclosed. References herein to "BILANTINE" should be understood to refer to one or more exemplary embodiments and it should not necessarily be inferred that features described as present in "BILANTINE" are present in all embodiments of the invention. Exemplary embodiments efficiently defend against Byzantine attacks in the bilevel FL setting by adaptively tuning the performance based on the number of Byzantine clients. In one or more embodiments, this is achieved by two robust aggregation algorithms at each level that interact iteratively by estimating the inner global model and the outer global variable, while adaptively removing Byzantine clients viewed as outliers.

The convergence properties of BILANTINE are theoretically analyzed below. Such analysis is challenging in the bilevel setting, due to the nested problem formulation and the interaction of the two robust aggregation algorithms. Despite the challenges due to the Byzantine attacks, we have found that the convergence rate of BILANTINE to a near stationary point of (1) is $\mathcal{O}(K^{-0.5})$, matching the convergence rate of the non-FL, non-Byzantine bilevel methods as well as the bilevel FL non-Byzantine methods.

A comprehensive empirical evaluation is provided to demonstrate the efficacy of BILANTINE to defend against several Byzantine attacks. It is shown that a single Byzantine client 216, 220, 224 can disrupt the bilevel FL training process if no measure is taken and that a robust aggregation algorithm applied only on a single level cannot address Byzantine attacks. Through extensive experiments, including ablation studies that explore the impact of environment, attack, and BILANTINE parameters, it is shown that BILANTINE is robust in mitigating the attacks with the global FL model and often achieves comparable performance to the model trained when no Byzantine attack is present.

Byzantine-Resilient FL

In the deep learning literature, a Byzantine resilient algorithm to defend distributed implementations of stochastic gradient descent (SGD) has been proposed. However, most of the conventional works have a common problem: they lose a lot of useful information to retain the convergence of the training algorithm. For example, one conventional approach selects only one out of all the uploaded gradients. One conventional approach is tailored to single-level FL problems. Moreover, in the data heterogeneous (non-independent and identically distributed (iid)) setting, finding the average of the honest clients' gradients is more challenging. All these approaches were proposed to defend against Byzantine attacks in the single-level FL setting.

Centralized Bilevel Learning

The nested problem of bilevel optimization can be traced back to conventional works. Thereafter, various efforts have been made to solve the bilevel optimization problem. Some earlier works reduce the bilevel problem to a single-level problem. However, reduction to a single-level problem poses several challenges owing to a large number of constraints. Recently, gradient-based first-order methods have been proposed. Although these methods perform well empirically, they either lack theoretical guarantees or focus only on asymptotic performance analysis. Moreover, conventional approaches provide non-asymptotic analysis of nonconvex SGD-type methods for bilevel problems. However, all these works focus on the non-federated bilevel setting.

Distributed Bilevel Learning

Building on centralized bilevel learning, the bilevel problem was formulated in the FL setting where multiple clients seek to learn lower and upper models under a central server. One conventional approach employs the non-robust mean aggregation rule where the global model is computed by taking the uniform average of the local models and such an aggregation poses a major security challenge in FL via Byzantine attacks. Moreover, decentralized bilevel optimization approaches that perform learning without a central server are not targeted to the client-server FL setting and none of them are robust to Byzantine attacks.

Federated Bilevel Learning Formulation

The set of clients $M=\{1, \ldots, M\}$ is such that $M \subseteq N$ where N denotes the total set of clients, where $N=\{1, \ldots, N\}$. One aim is to solve the following federated bilevel optimization problem:

$$\min_{x \in \mathbb{R}^d} f(x) := \frac{1}{M} \sum_{i=1}^{M} f_i(x, y^*(x)) \quad \text{(upper)} \quad (1a)$$

$$\text{s.t. } y^*(x) = \arg\min_{y \in \mathbb{R}^{d'}} \frac{1}{M} \sum_{i=1}^{M} g_i(x, y) \quad \text{(lower)} \quad (1b)$$

In the optimization literature, one stochastic bilevel problem (see equations 1a and 1b) is referred to as the stochastic bilevel problem, where the upper-level optimization problem depends on the solution of the lower-level optimization problem over $y \in \mathbb{R}^{d'}$, denoted as $y^*(x)$, which depends on the value of the upper-level variable $x \in \mathbb{R}^d$. Each client $i \in M = \{1, \ldots, M\}$ has its own upper and lower functions $f_i = \mathbb{E}_{\xi_i}[f_i(x, y^*(x); \xi_i)]$ and $g_i = \mathbb{E}_{\zeta_i}[g_i(x, y(x); \zeta_i)]$, where $(\xi_i, \zeta_i) \sim (C_i, D_i)$ denote the upper and lower data distributions. In practical scenarios, the dataset may not be i.i.d. across clients and, therefore, $(C_i, D_j)$ can be different from $(C_j, D_j)$ for $i \neq j$.

A General Bilevel FL Method

A general approach to solve to the stochastic bilevel problem (equations 1a and 1b) is via a conventional iterative algorithm operating in two nested loops. With the detailed updates specified in the section entitled "Byzantine-resilient Federated Bilevel Learning Algorithm," the inner loop approximates $y^*$ while the outer loop operates approximates $x^*$.

Inner Loop

Each client i receives the current global model $x^k$ and $y^{k,t}$ from the aggregator server 212 and obtains an estimate of its local model $y_i^{k,t+1}$. The aggregator server 212 receives the local models from the clients and updates the model as:

$$y^{k,t+1} = \frac{1}{M} \sum_{i=1}^{M} y_i^{k,t+1} \quad (2)$$

Outer Loop

In the outer loop, each client i receives the current model $x^k$ and $y^{k,T}$ from the aggregator server 212 and obtains an estimate of its local model $x_i^{k+1}$. The aggregator server 212 receives the local models from the clients 216, 220, 224 and updates the model as:

$$x^{k+1} = \frac{1}{M} \sum_{i=1}^{M} x_i^{k+1} \quad (3)$$

Negative Effects of Byzantine Clients

Figure 2:
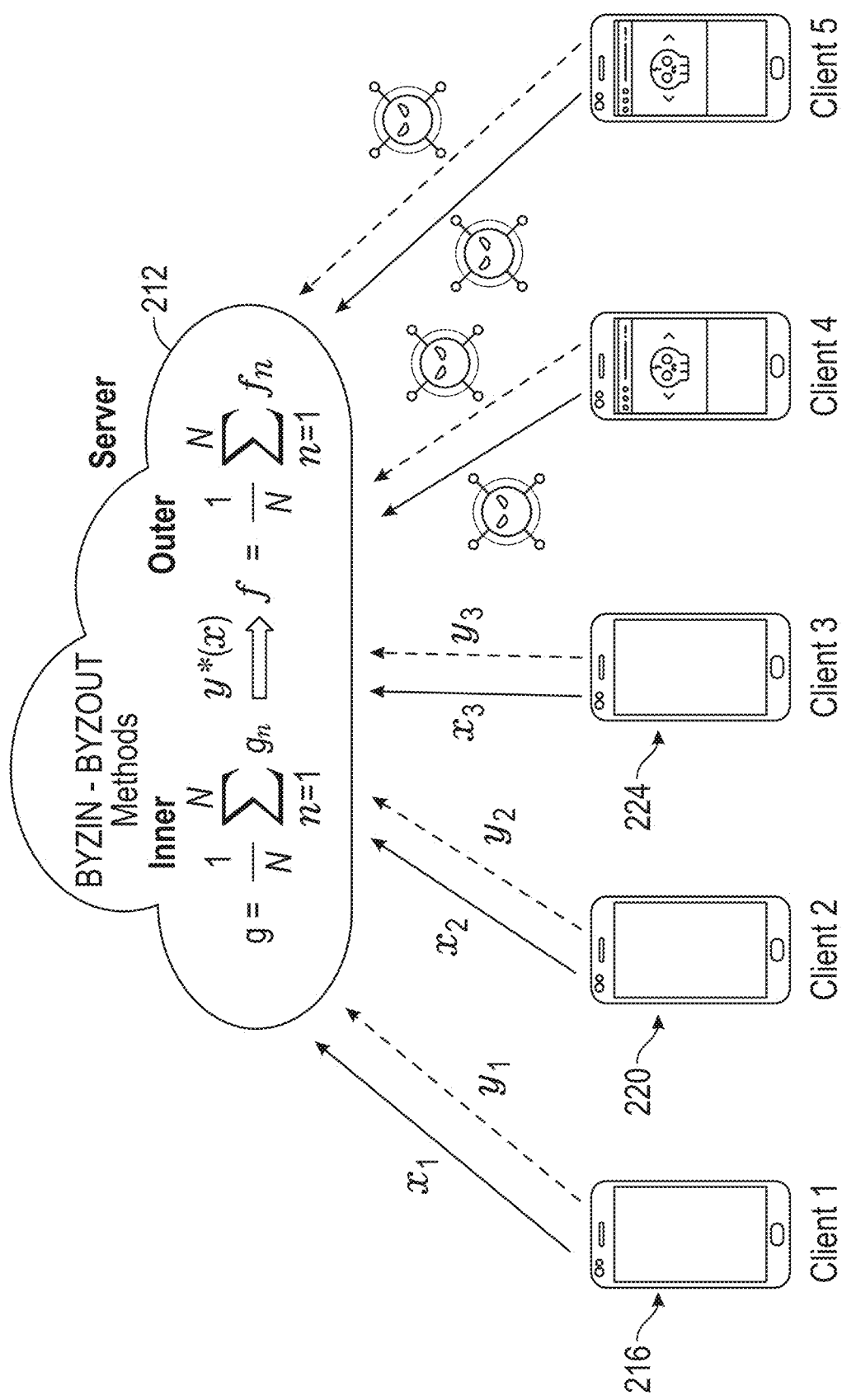
FIG. 2 illustrates the operation of federated bilevel optimization under Byzantine attacks.

FIG. 2 illustrates the operation of federated bilevel optimization under Byzantine attacks. In the federated setup, Byzantine failures may occur when clients 216, 220, 224 upload their models after being under attack by hackers or after hardware/software malfunctions. Consequently, these Byzantine clients 216, 220, 224 upload arbitrary information to the aggregator server 212, significantly deteriorating the learning process. Let $\hat{x}_i^{k+1}$ and $\hat{y}_i^{k,t+1}$ denote the upper/lower models uploaded by client i. A generalized Byzantine model is given as:

$$\hat{x}_i^{k+1} = \begin{cases} x_i^{k+1} & \text{if } i \in \mathcal{M} \\ * & \text{if } i \in \mathcal{B} \end{cases} \quad (4)$$

$$\hat{y}_i^{k,t+1} = \begin{cases} y_i^{k,t+1} & \text{if } i \in \mathcal{M} \\ * & \text{if } i \in \mathcal{B} \end{cases} \quad (5)$$

where $\mathcal{B} \subseteq \mathcal{N}$ denotes the set of Byzantine clients 216, 220, 224, $\mathcal{M} \subseteq \mathcal{N} \setminus \mathcal{B}$ denotes the set of honest clients 216, 220, 224 and $*$ denotes an arbitrary vector. B is denoted as $|\mathcal{B}|$ and M as $|\mathcal{M}|$, where M+B=N. For example, if a client i is Byzantine, it can choose to send $\hat{x}_i^{k+1} = \infty$ or $\hat{y}_i^{k,t+1} = \infty$. It can also send $$\hat{x}_i^{k+1} = -\sum_{i=1}^{N-1} x_i^{k+1} \text{ or } \hat{y}_i^{k,t+1} = -\sum_{i=1}^{N-1} y_i^{k,t+1}.$$

Under these cases, the global aggregated models $x_{k+1}$ or $y_{k,t+1}$ at the aggregator server 212 will become either infinite or null. Indeed, it is shown that even a single Byzantine client 216, 220, 224 in either level of the optimization problem (1) can disrupt the training process (see FIG. 8A).

Byzantine-Resilient Federated Bilevel Learning Algorithm

FIG. 3 is an example algorithm (Algorithm 1) for the Byzantine-resilient federated bilevel algorithm (BILANTINE), in accordance with an example embodiment. Formally summarized in Algorithm 1, BILANTINE operates in two nested loops. The outer loop operates in rounds $k \in \{1, \ldots, K\}$. Within each round k, the inner loop operates in iterations $t \in \{1, \ldots, T\}$. Using $x^k$ and $y^k$, the inner iteration t estimates a global model $y^{k,t+1}$ as the inner optimization variable $y^*(x^k)$ as the output of BYZIN. The final output $y^{k+1} = y^{k,T}$ of the inner loop is then input to BYZOUT to estimate the upper global variable $x^{k+1}$.

FIG. 4 is an example subroutine algorithm (Algorithm 2, BYZIN) for a Byzantine-resilient gradient-based optimizer involving local steps $v \in \{0, \ldots, \tau_i - 1\}$ for the Byzantine-resilient federated bilevel algorithm, in accordance with an example embodiment. FIG. 5 is an example subroutine algorithm (Algorithm 3, BYZOUT) for a Byzantine-resilient gradient-based optimizer involving local steps $v \in \{0, \ldots, \tau_i - 1\}$ for the Byzantine-resilient federated bilevel algorithm, in accordance with an example embodiment. BYZIN performs the local steps on the inner variable $y_{i,v}$ while BYZOUT performs local steps on the upper variable $x_{i,v}$. FIG. 7 is an example algorithm (Algorithm 5) for the seminal component for both subroutines (Algorithms 2 and 3) which provides resilience against Byzantine clients by adaptively removing the outliers in accordance with an example embodiment.

Solving the stochastic bilevel problem (equations 1a and 1b) requires computing the gradient of the upper-level function (i.e.

$$\nabla f(x) = \frac{1}{M} \sum_{i=1}^{M} f_i(x)\Big)$$

usually referred to as the hypergradient. The Hessian Inverse (InvHG) sub-routine is leveraged to efficiently approximate $\nabla f(x)$.

Hessian Inverse (InvHG)

FIG. 6 is an example algorithm for computing the Hessian inverse, in accordance with an example embodiment. The computation of the hypergradient is given by:

$$\nabla f_i(x,y^*(x)) = \nabla_x f_i(x,y^*(x)) - \nabla_{xy}^2 g(x,y^*(x))[\nabla_y^2 g(x,y^*(x))]^{-1} \nabla_y f_i(x,y^*(x)) \quad (6)$$

Due to the nested nature of the problem, the upper-level problem depends on the solution of the lower-level problem $y^*(x)$. Moreover, the computation of Hessian inverse in (6) requires the global Hessian (which is unavailable at the client 216, 220, 224). The InvHG subroutine is used to address this challenge and compute the Hessian inverse. InvHG uses a client sampling strategy to efficiently approximate the second term on the right-hand side (RHS) of (6). More specifically, given $R \in N$, $R' \in \{0, \ldots, R-1\}$ and $\mathcal{N}_0, \ldots \mathcal{N}_{R'} \in \mathcal{N}$ uniformly at random (UAR) are chosen. For $i \in \mathcal{N}$:

$$h_i(x, y) = -\nabla_{xy}^2 g_i(x, y; \zeta_i) p'_R \quad (7)$$

where $p'_R = |\mathcal{N}_0|^{-1} \hat{H}_y \sum_{i \in \mathcal{N}_0} \nabla_y f_i(x, y, \xi_{i,0})$ and $\hat{H}_y$ is $\hat{H}_y = $ (8)

$$\frac{R}{\ell_{g,1}} \prod_{r=1}^{R'} \left( I - \frac{1}{\ell_{g,1}|\mathcal{N}_r|} \sum_{i=1}^{|\mathcal{N}_r|} \nabla_y^2 g_i(x, y; \zeta_{i,r}) \right).$$

BYZOUT

For BYZOUT, the notation is simplified by denoting input of the function as $(x, y^+)$ instead of $(x^k, y^{k+1})$ and the output as $x^+$ instead of $x^{k+1}$. All clients 216, 220, 224 in parallel approximate their indirect gradients $h_i$. The aggregator server 212 then computes the global $\bar{h}$ via RES that eliminates the outliers and takes the average of the remaining $h_i$. The aggregator server 212 transmits $\bar{h}$ to all the clients 216, 220, 224. Each client 216, 220, 224 then uses and performs $\tau_i$ local updates on the upper variable $x_i$ and communicates $x_{i,\tau_i}$ to the aggregator server 212. Finally, the aggregator server 212 calls the subroutine RES to eliminate the Byzantine models.

BYZIN

For BYZIN, the notation is simplified by denoting input of the function as (x,y) instead of $(x^k, y^{k,t})$. In each inner iteration t, each client 216, 220, 224 locally updates its model $y_i$ multiple times before transmitting it to the aggregator server 212. The aggregator server 212 filters outs the outliers using RES before performing the aggregation step.

RES

The design of the disclosed RES (Algorithm 5) is based on the observation that the honest models are not very dissimilar and that the Byzantine models must be sufficiently different from the honest models in order to successfully alter the aggregation results. And if Byzantine models are similar to the honest models, the attack will cause no harm to the aggregation results. At each iteration j, RES allows the aggregator server 212 to eliminate the outliers from the current mean, i.e. it adaptively removes $\lfloor \eta_x N \rfloor$ models based on the distance between current average $g^{av}$ and the remaining set of $\mathcal{G}$.

Convergence and Robustness Analysis

The convergence analysis of the proposed BILANTINE algorithm and the impact of Byzantine clients 216, 220, 224 on the convergence rate is described below. The following assumption is made on the number of Byzantine clients 216, 220, 224 in the subsequent analysis.

Assumption 1 (Proportion of Byzantine Clients)

With the total number of clients 216, 220, 224 denoted as N, it is assumed that no more than half of the upper and lower clients 216, 220, 224 are Byzantine, i.e. $B = \eta_u N = \eta_l N$ where $\eta_u, \eta_l < 0.5$. The above assumption is commonly used in single-level Byzantine-resilient approaches.

The following two assumptions on the upper- and lower-level objective functions are made.

Assumption 2 (Lipschitz Continuity)

Denote $z = (x,y)$. Assume that $f_i(z)$, $\nabla f_i(z)$, $\nabla g_i(z)$, $\nabla^2 g_i(z)$ are $l_{f,0}$, $l_{f,1}$, $l_{g,1}$, $l_{g,2}$ Lipschtiz continuous, respectively.

Assumption 3 (Strongly Convex Lower-Level Objective)

For any fixed x, $g_i(x,y)$ is $\mu_g$-strongly convex in y, that is, $\nabla_y^2 g_i(x,y) \succeq \mu_g I$.

The following assumption on the stochastic estimates of the derivatives of upper- and lower-level functions is made.

Assumption 4 (Stochastic Derivatives)

The derivatives $\nabla f_i(z;\xi)$, $\nabla g_i(z;\zeta)$, $\nabla^2 g_i(z;\zeta)$ are unbiased estimators of $\nabla f_i(z)$, $\nabla g_i(z)$, $\nabla^2 g_i(z)$, respectively, $\forall_i \in M$; and their variances are bounded, i.e.

$$\mathbb{E}_\xi[\|\nabla f_i(z;\xi) - \nabla f_i(z)\|^2] \leq \sigma_f^2$$

$$\mathbb{E}_\zeta[\|\nabla g_i(z;\zeta) - \nabla g_i(z)\|^2] \leq \sigma_{g,1}^2$$

$$\mathbb{E}_\zeta[\|\nabla^2 g_i(z;\zeta) - \nabla^2 g_i(z)\|^2] \leq \sigma_{g,2}^2$$

for some $\sigma_f^2$, $\sigma_{g,1}^2$, $\sigma_{g,2}^2$.

Assumptions 2 and 3 together ensure that the first- and second-order derivatives of the objectives $f$ and $g$ and the solution mapping $y^*(x)$ are well-behaved. If Assumption 3 does not hold, the analysis of bilevel problems becomes intractable as the Hessian in (6) is not invertible. This assumption is standard in bilevel optimization and, as described in the introduction, it has not prevented its usage in various application domains. Exemplary embodiments do not necessarily make any assumption on the objective of the upper-level problem, which can be non-convex. Assumption 4 is the counterpart of the unbiasedness and bounded variance assumption used in the single-level stochastic optimization literature. All the above assumptions are standard in the non-asymptotic analysis of stochastic bilevel optimization literature.

Next, it is shown that the results of the RES aggregation are close to the average of the honest models. Specifically, the following lemma is provided. For notational brevity, the iteration indexes are omitted.

Lemma 1

Denote upper and lower honest models (i.e., local models of honest $l_{g,2}$ clients 216, 220, 224) as $x_1, x_2, \ldots, x_M$ and $y_1, y_2, \ldots, y_M$, respectively. Further, denote upper and lower Byzantine models as $a_1, a_2, \ldots, a_B$ and $c_1, c_2, \ldots, c_B$, respectively; at each level, M+B=N. Let $$x = \frac{1}{M} \sum_{j=1}^{M} x_j \text{ and } y = \frac{1}{M} \sum_{j=1}^{M} y_j.$$

If it is assumed that $\exists \epsilon_u > 0$, $\|x_j - x\| \leq \epsilon_u$ and $\exists \epsilon_l > 0$, $\|y_j - y\| \leq \epsilon_l$ for $j \in \{1, 2, \ldots, M\}$, then after the process of RES, it follows:

$$\|\bar{x} - x\|^2 \leq \frac{\epsilon_u^2}{(1 - 2\eta_u)^2} \text{ and } \|\bar{y} - y\|^2 \leq \frac{\epsilon_l^2}{(1 - 2\eta_l)^2}$$

where $$\bar{x} = \frac{1}{p_u}\sum_{i=1}^{p_u} x_i;\ \bar{y} = \frac{1}{p_l}\sum_{i=1}^{p_l} y_i;\ p_u = N - \lceil \eta_u N \rceil \text{ and } p_l = N - \lceil \eta_l N \rceil;$$

$\eta_u$ and $\eta_l$ denote the assumed proportion of upper and lower Byzantine clients.

Lemma 1 bounds the distance between the average of the honest variables and the remaining variables.

Next, the convergence rate of BILANTINE is characterized by using a new Lyapunov function defined as:

$$\mathbb{W}^k := f(\bar{x}^k) + \frac{M_f}{L_y}(\|y^*(x^k) - y^k\|^2) \quad (9)$$

where $M_f$ and $L_y$ are constants.

The above Lyapunov function was designed to be specifically tailored to show the convergence BILANTINE. This Lyapunov function is slightly different from the one used by conventional techniques which proved the convergence either under bilevel non-FL setting or bilevel FL setting under no Byzantine attacks; e.g., they use $f(x^k)$ as the first term on the right-hand side (RHS) of Equation (9).

Theorem 1

Under Assumptions 2-4, define constants as $\alpha_i^k = \alpha_k/\tau_i$, $\beta_i^k = \beta_k/\tau_i$, $\forall i \in \mathcal{N}$, where $$\beta_k = \frac{\bar{\beta}\alpha_k}{T},\ \alpha_k = \min\left\{\bar{\alpha}_1, \bar{\alpha}_2, \frac{\bar{\alpha}}{\sqrt{K}}\right\} \quad (10)$$

and where $\bar{\alpha}_1$, $\bar{\alpha}_2$, $\bar{\alpha}$, and $\bar{\beta}$ are some positive constants independent of K. Then for T=1 and $\tau_i$=1, the iterates $\{(x_k, y_k)\}_{k\geq 0}$ generated by BILANTINE satisfy $$\frac{1}{K}\sum_{k=1}^{K}\mathbb{E}[\|\nabla f(x^k)\|^2] = \quad (11)$$

$$O\left(\frac{1}{\min\{\bar{\alpha}_1, \bar{\alpha}_2\}K} + \frac{\bar{\alpha}\max(\sigma_{g,1}^2, \sigma_{g,2}^2, \sigma_f^2)}{\sqrt{K}} + b^2\right) +$$

$$O\left(\frac{\frac{\epsilon_u^2}{(1-2\eta_u)^2}}{\min\{\bar{\alpha}_1, \bar{\alpha}_2\}K} + \frac{\frac{\epsilon_u^2}{(1-2\eta_u)^2}}{\bar{\alpha}\sqrt{K}} + \frac{\epsilon_u^2}{(1-2\eta_u)^2} + \frac{\epsilon_q^2}{(1-2\eta_l)^2}\right)$$

where $b = \kappa_g 1_{f,1}((\kappa_g-1)/\kappa_g)^R$, $\kappa_g = 1_{g,1}/\mu_g$ is the condition number of $g(x,\cdot)$, and R is the input of InvHG. (Theorem 1 implies that the convergence rate of BILANTINE to a near stationary point of (1) is $O(K^{-0.5})$, matching the convergence rate of the conventional non-federated non-Byzantine bilevel methods as well as the federated non-Byzantine bilevel methods, despite the challenges due to the Byzantine attacks).

Impact of Byzantine Clients

Compared to a conventional technique, BILANTINE incurs an additional asymptotic error term:

$$\lim_{K,R\to\infty} \frac{1}{K}\sum_{k=1}^{K}\mathbb{E}[\|\nabla f(x^k)\|^2] = O\left(\frac{\epsilon_u^2}{(1-2\eta_u)^2} + \frac{\epsilon_q^2}{(1-2\eta_l)^2}\right) \quad (12)$$

This error depends on the proportion of upper and lower Byzantine clients $\eta_u$ and $\eta_l$ and the bounds due to data heterogeneity $\epsilon_u$ and $\epsilon_q$. Higher $(\eta_u, \eta_l)$ yield a rapid, hyperbolic increase of the asymptotic error. Such a term also appears in the single-level Byzantine-resilient FL with non-i.i.d. data. However, this is a worst case bound and the exemplary experiments show that this error is small and yields more graceful performance degradation as $(\eta_u, \eta_l)$ increase.

Numerical Evaluation

Experiments on the disclosed Byzantine-resilient bilevel methods implemented on an open source machine learning framework on a conventional graphics processing unit (GPU) are presented below.

Experimental Setup

Experiments were conducted on the task of data reweighting for noisy samples on a conventional large database of handwritten digits following the settings of a conventional system. The goal of data reweighting is to train a classifier in the situation that a proportion of the training labels are corrupted. Clean data was used as validation data, the rest as the training data, and one hyperparameter (i.e., weights) was assigned to each training example. More specifically, denote x as the weights of the training data and y as the parameters of the classifier. Let l be the cross-entropy loss corresponding to y in both training objective g and validation objective $f$. For the training phase, a hyperparameter vector $x \in [0, 1]$ was additionally added, i.e. a reweighted variant of the loss, denoted by $$g(x, y) = \frac{1}{n}\sum_{j=1}^{n}\sigma(x^j)l(y, \zeta^j),$$

is defined as the empirical loss on the training set, where $\sigma(.)$ is the sigmoid function and $x^j$ is the weight corresponding to sample $\zeta^j$; n denotes the number of training samples. The aim is to fit a model y to minimize the training loss and the hyperparameters x to minimize the validation loss.

2000, 200, and 1000 images were randomly selected from the conventional large database of handwritten digits for training, validation, and testing, respectively. Each label in the training data is replaced by a wrong label sampled uniformly with a probability of 0.5. x denotes the logits of the weights of the training samples, and y denotes parameters of a multilayer perceptron (MLP) of size 784→256→10. A batch size of 100 was used, and the outer and inner learning rates were set as 10 and 0.3 respectively.

Attack and Defense on Different Levels

Experiments were conducted on three Byzantine attacks: Gaussian, sign-flipping, and same-value. For the Gaussian attack, each Byzantine client 216, 220, 224 crafts its model from a Gaussian distribution $\sim \mathcal{N}_G(\mu^G, \sigma^G)$. For sign-flipping attacks, each Byzantine client 216, 220, 224 flips the sign of its original model parameters and enlarges the magnitude, i.e. each Byzantine client i calculates the true model $\tilde{x}_i^k$ and then sends $x_i^k = a\tilde{x}_i^k$ to the aggregator server 212, where a is a negative constant. For same-value attacks, the message sent by each Byzantine client 216, 220, 224 is $c\|$, where $\|$ is an all-one vector and c is a constant. In the following, subscripts $\{a_{in}, a_{out}, c_{in}, c_{out}\}$ are used to denote lower and upper level hyperparameters.

Figure 8A:
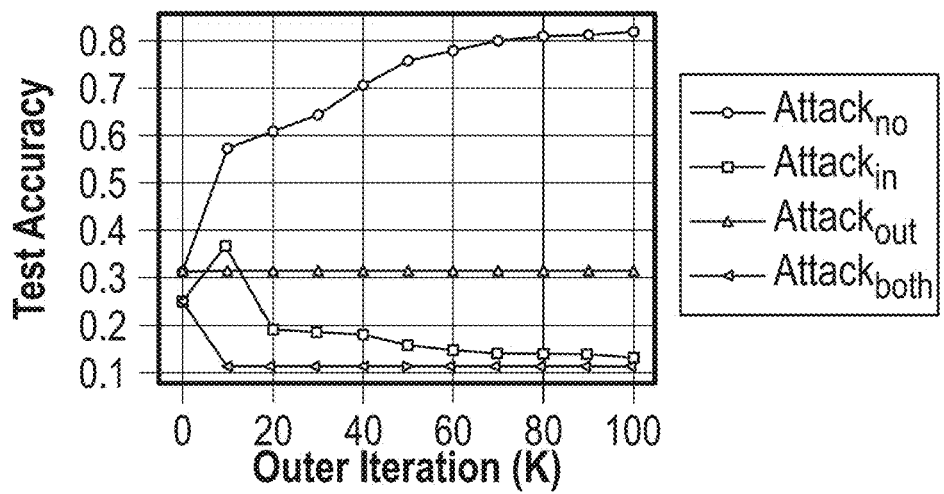
FIG. 8A shows the test accuracy vs the number of iterations on the data reweighting task for M=10 and B=1 under same-value attacks, where M and B denote the number of honest and Byzantine clients, respectively, in accordance with an example embodiment.
Figure 8B:
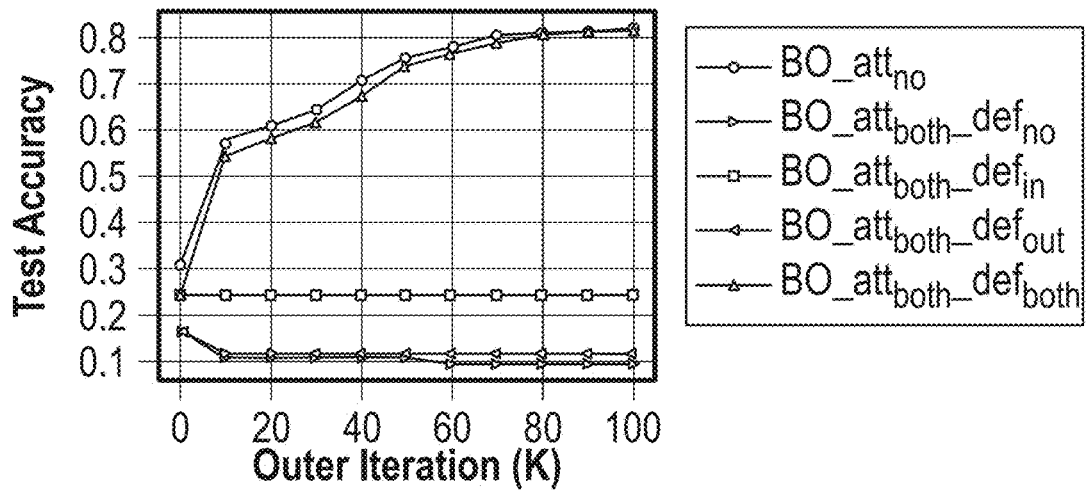
FIG. 8B shows the test accuracy vs the number of iterations for M=10 and B=3 under same-value attacks, in accordance with an example embodiment.
Figure 8C:
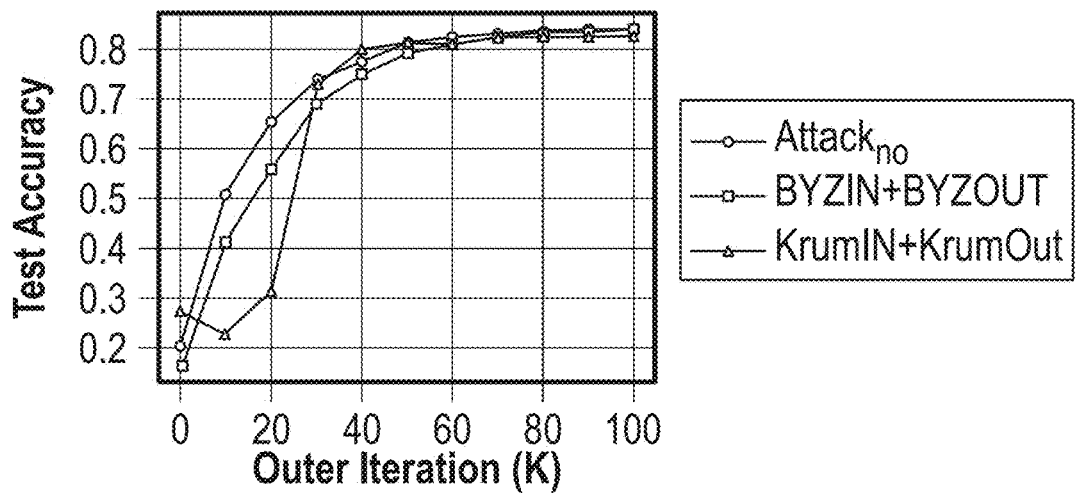
FIG. 8C compares the disclosed method against the no-attack method and a new baseline created for the disclosed bilevel setting based on a conventional single-level defense method, in accordance with an example embodiment.

FIG. 8A shows the test accuracy vs the number of iterations on the data reweighting task for M=10 and B=1 under same-value attacks, where M and B denote the number of honest and Byzantine clients 216, 220, 224, respectively, in accordance with an example embodiment. Unless otherwise stated, settings $c_{out}=-100$, $c_{in}=0.001$ are used for same-value attacks. These values are chosen to maximize the negative effect due to Byzantine clients 216, 220, 224. FIG. 8A illustrates that Byzantine attacks are lethal to bilevel tasks in the presence of even a single Byzantine client 216, 220, 224 at either level of the optimization problem (1). One or more embodiments advantageously provide Byzantine-robust algorithms in the bilevel learning setting to address the problem illustrated in FIG. 8A. FIG. 8B shows the test accuracy vs the number of iterations for M=10 and B=3 under same-value attacks, in accordance with an example embodiment. The results demonstrate the efficacy of the disclosed BYZIN and BYZOUT methods. Label BO_att_{.}_def_{.} represents attack and defense under different settings (e.g. BO_att_{both}_def_{out} refers to the case where there are attacks on both levels but defend only the upper level). It was observed that defense at a single level (lower or upper) is not able to defend against Byzantine attacks; bilevel tasks, therefore, require well-designed defense algorithms at both levels. Second, the disclosed BYZIN and BYZOUT algorithms together can achieve nearly no-attack performance. FIG. 8C compares an exemplary embodiment against the no-attack method and a new baseline created for the disclosed bilevel setting based on a conventional single-level defense method, in accordance with an example embodiment. The exemplary embodiment performs better than the conventional single-level defense method, justifying the disclosed choice of using per-level defense in the bilevel FL setting. Advantageously, some embodiments use known techniques for fast aggregation against Byzantine attacks, Performance on Non-Iid Data Considering the data heterogeneity across clients 216, 220, 224, an exemplary embodiment was also tested on non-iid data for M=5 and B=3. To generate the non-iid setting, labels were randomly distributed from two random classes to each honest client 216, 220, 224, i.e. each honest client 216, 220, 224 receives data from only two distinct labels. FIG. 9C shows the test accuracy performance on the non-iid setting under same-value attacks. It was observed that the disclosed method performs comparable to the no-attack case, demonstrating that the exemplary embodiment can successfully defend against Byzantine attacks even in the non-iid setting.

Ablation Studies

Several ablation studies were performed on additional attacks and various pertinent parameters pertaining to the disclosed defense and different attacks. For all the ablation studies, unless otherwise specified, M=10 and B=3.

Additional Attacks

Figure 9A:
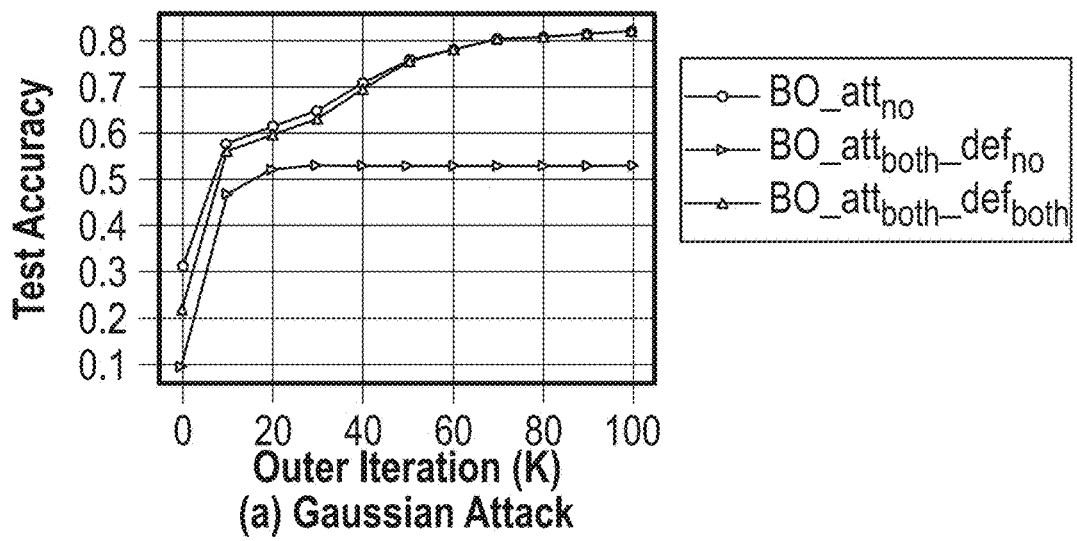
FIGS. 9A-9B illustrate the test accuracy performance under Gaussian attack and sign-flipping attack, in accordance with an example embodiment.
Figure 9B:
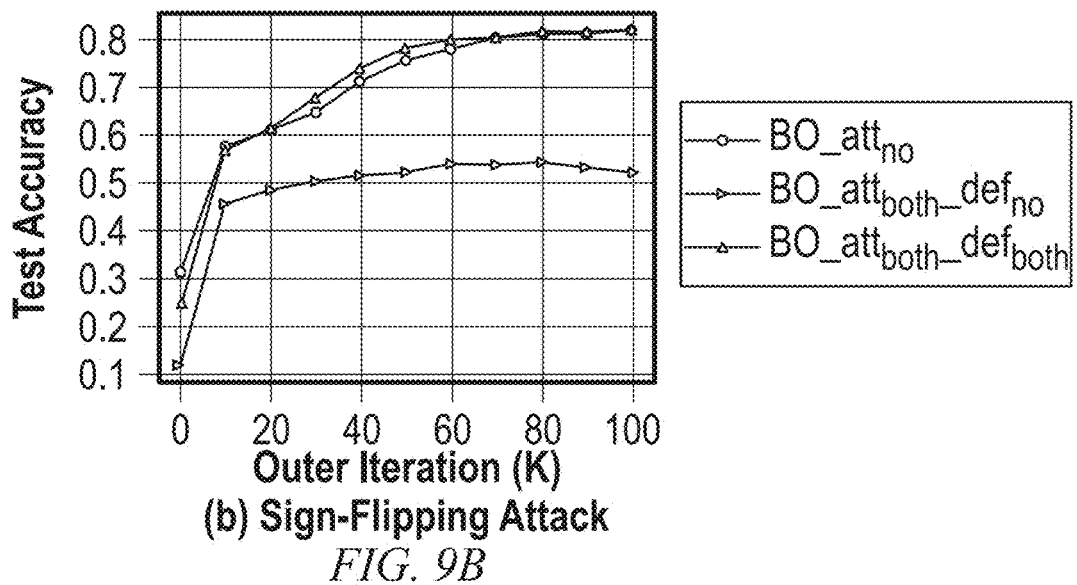
Figure 9C:
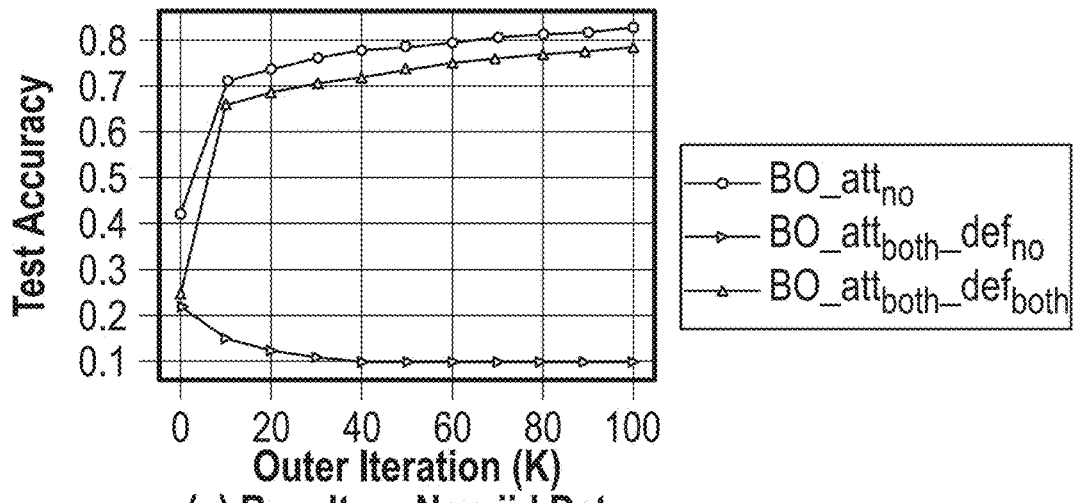
FIG. 9C shows the test accuracy performance on the non-iid (non-independent and identically distributed) setting under same-value attacks, in accordance with an example embodiment.

FIGS. 9A-9B illustrate the test accuracy performance under Gaussian attack and sign-flipping attack, in accordance with an example embodiment. For the sign-flipping attack, $a_{in}=-0.001$, $a_{out}=-4$. For Gaussian attacks, $\mu_{in}=0.01$, $\sigma_{in}=0.003$, $\sigma_{out}^G=0.001$, and $\sigma_{out}^G=0.0005$. It was observed that the exemplary embodiment achieves nearly no-attack performance on both attacks.

Varying B

Figure 10A:
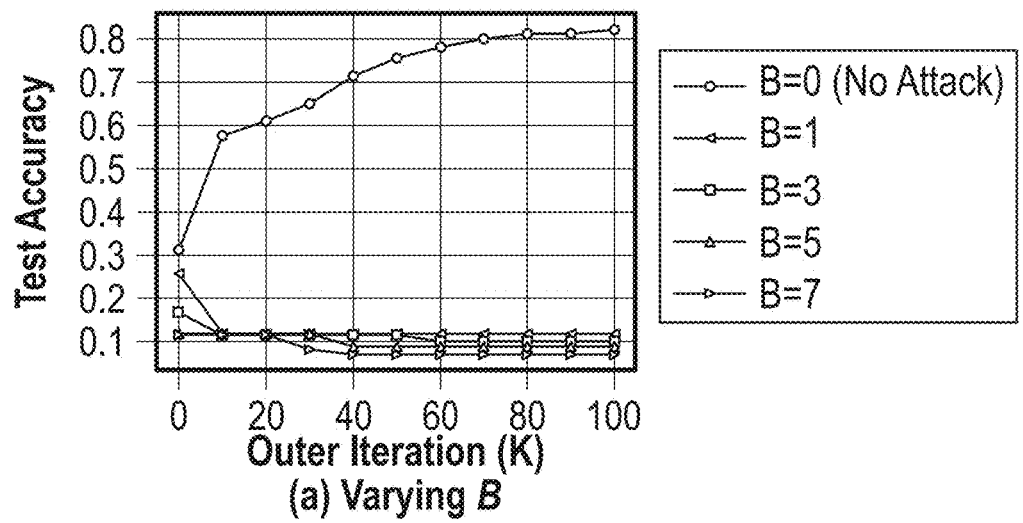
FIG. 10A shows the effect of varying the number of Byzantine clients B, in accordance with an example embodiment.

FIG. 10A shows the effect of varying the number of Byzantine clients B, in accordance with an example embodiment. It was observed that even a single Byzantine client can successfully disrupt the bilevel FL training. Increasing the number of Byzantine clients 216, 220, 224 will make the attack more severe, further deteriorating accuracy.

Varying $\eta_u$, $\eta_l$

Figure 10B:
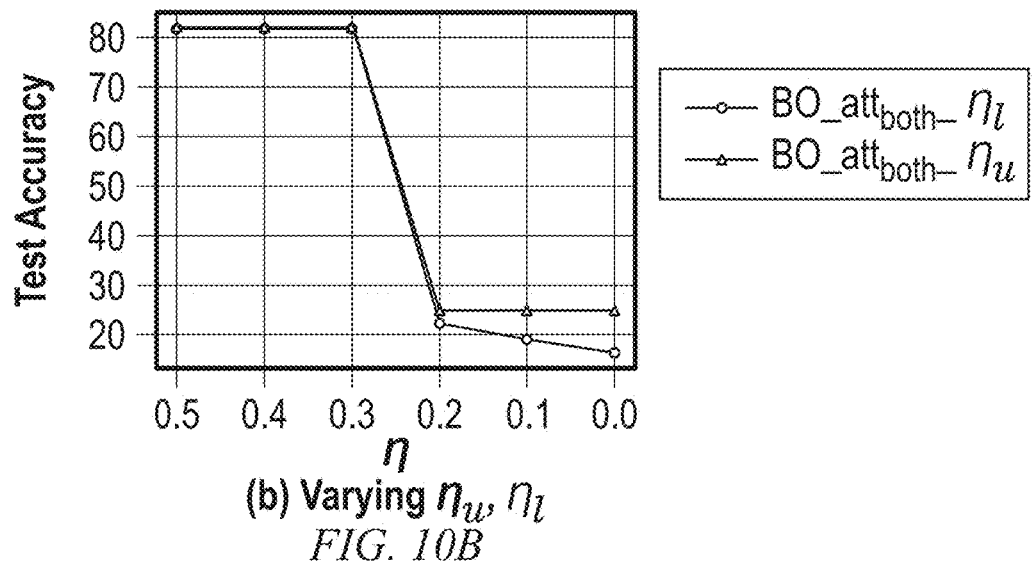
FIG. 10B shows the effect of varying the assumed proportion of upper- and lower-level Byzantine clients, in accordance with an example embodiment.

FIG. 10B shows the effect of varying the assumed proportion of upper- and lower-level Byzantine clients 216, 220, 224, in accordance with an example embodiment. For the experiment on $\eta_l$, $\eta_u$ was set to 0.3. Similarly, for the experiment on $\eta_u$, $\eta_l$, was set to 0.3. It was observed that decreasing both $\eta_u$ and $\eta_l$ deteriorates the performance. Performance degrades significantly when $\eta$ attains the value of 0.2. This is because, in the disclosed experimental setting, about 23% of both upper- and lower-level clients are Byzantine (since M=10 and B=3). It was also observed that decreasing $\eta_l$ deteriorates the performance by a larger margin. For example, when $\eta$ is 0.0 (i.e., under no-defense setting), $\eta_l$ achieves 16.5% test accuracy as compared to 24.7% of $\eta_u$.

Varying $c_{out}$

Figure 10C:
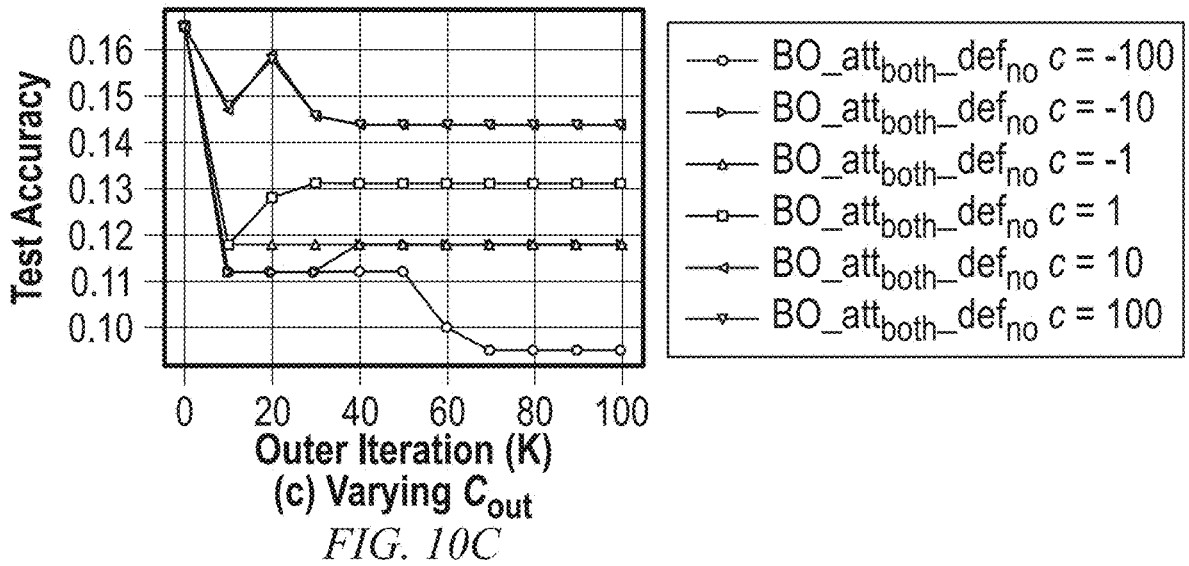
FIG. 10C shows the effect of varying $c_{out}$, the hyperparameter in the same-value attacks, in accordance with an example embodiment.

FIG. 10C shows the effect of varying $c_{out}$, the hyperparameter in the same-value attacks (see section entitled "Experimental Setup"), in accordance with an example embodiment. It was observed that a larger negative value achieves a more lethal attack, significantly reducing the testing accuracy. For example, $c_{out}=-100$ achieves a testing accuracy of 9.7% as compared to 14.4% achieved by $c_{out}=-100$. However, from FIG. 8B, even for $c_{out}=-100$, the exemplary embodiment can successfully defend against the attack and achieve nearly no-attack performance.

Varying $\mu_{out}^G$, $\sigma_{out}^G$

Figure 11:
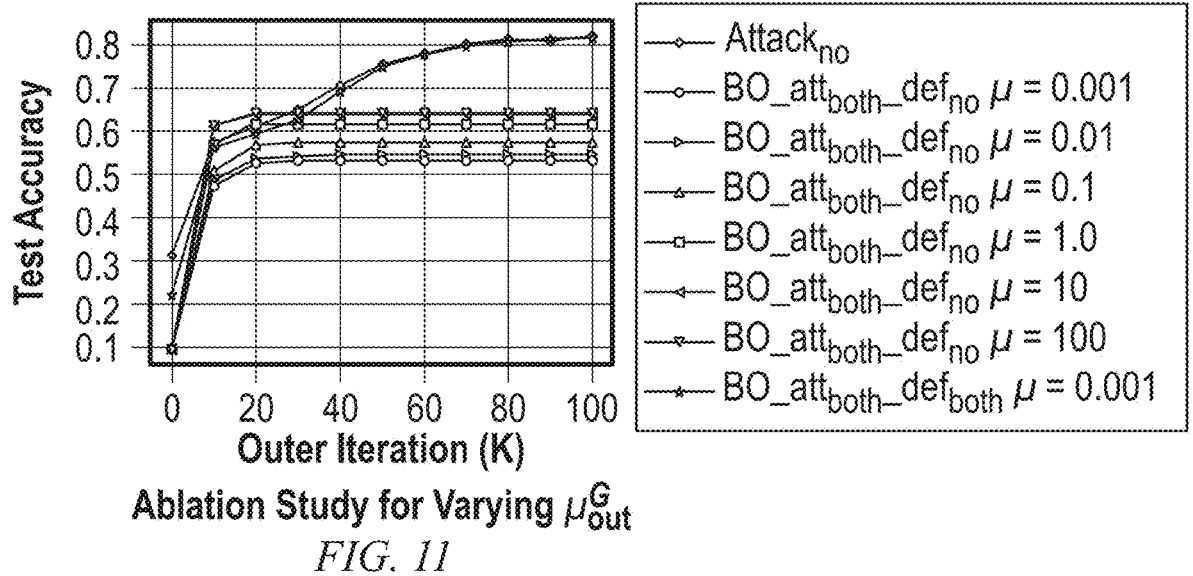
FIGS. 11-12 show the effect of varying the parameters $\mu_{out}^G$ and $\sigma_{out}^G$ of the Gaussian attacks while keeping all other parameters constant, in accordance with an example embodiment.
Figure 12:
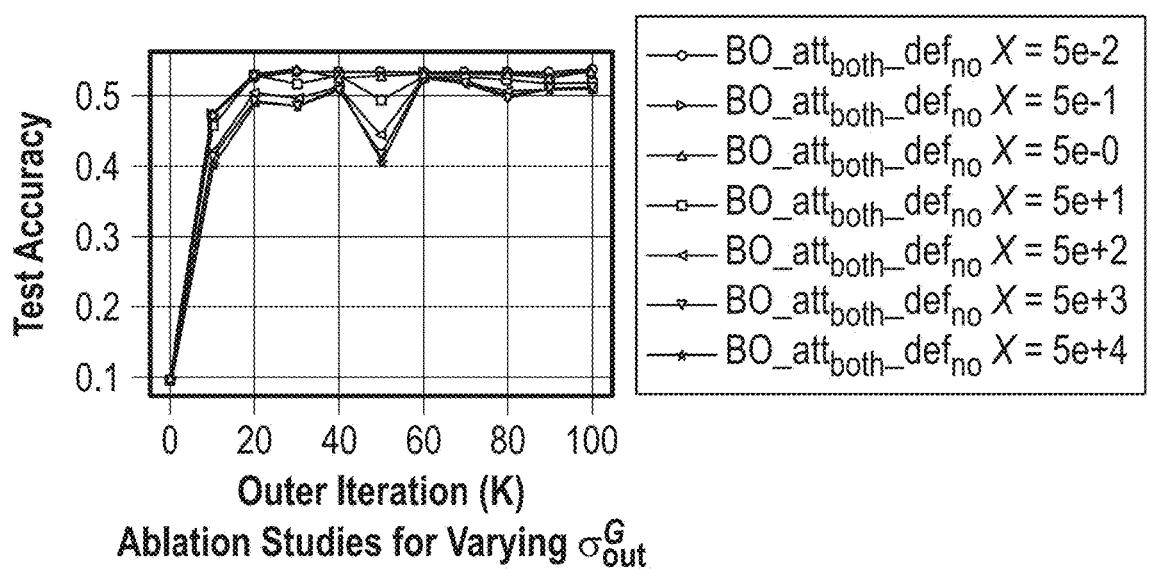

FIGS. 11-12 show the effect of varying the parameters $\mu_{out}^G$ and $\sigma_{out}^G$ of the Gaussian attacks while keeping all other parameters constant, in accordance with an example embodiment. It was observed that a smaller value of $\mu_{out}^G$ achieves a lower test accuracy, thereby generating a more lethal attack as compared to a larger value. For example, $\mu_{out}=0.001$ achieves a test accuracy of 53.27% as compared to 64.15% achieved by $\mu_{out}=100$. However, even for $\mu_{out}=-0.001$, the exemplary embodiment can successfully defend against the attack and achieve nearly no-attack performance. On the contrary, a larger value of $\sigma_{out}^G$ achieves a lower test accuracy. For example, $\sigma_{out}=5e+4$ achieves a test accuracy of 51.18% as compared to 52.25% achieved by $\sigma_{out}=5e-2$. However, from FIG. 9A, it was observed that even for $\sigma_{out}=-0.001$, the exemplary embodiment can successfully defend against the attack and achieve nearly no-attack performance.

Given the discussion thus far, it will be appreciated that, in general terms, an exemplary method, according to an aspect of the invention, includes the operations of receiving, by an aggregator, updated parameters associated with a lower-level system from a plurality of client computers; generating, using data from an identified first set of lower-level non-Byzantine client computers, of the plurality of client computers, which are characterized as being non-Byzantine for the lower-level system, an intermediate global lower-level machine learning model by executing federated learning model training and aggregation; generating, using data from an identified second lower-level set of non-Byzantine client computers, of the plurality of client computers, which are characterized as being non-Byzantine for the lower-level system, a global lower-level machine learning model by executing the federated learning model training and aggregation; generating, using data from an identified first upper-level set of non-Byzantine client computers, of the plurality of client computers, which are characterized as being non-Byzantine for an upper-level system, an intermediate global upper-level machine learning model by executing the federated learning model training and aggregation; generating, using data from a second upper-level set of client computers, of the plurality of client computers, which are characterized as being non-Byzantine for the upper-level system, a global upper-level machine learning model by executing the federated learning model training and aggregation; and transmitting, by the aggregator, the global upper-level machine learning model to at least one of the plurality of client computers.

In one example embodiment, the intermediate global lower-level machine learning model is transmitted, by the aggregator, to at least one of the plurality of client computers; revised parameters associated with the lower-level system are received, by the aggregator, from at least one of the plurality of client computers; the global lower-level machine learning model is transmitted, by the aggregator, to at least one of the plurality of client computers; updated parameters associated with the upper-level system are received, by the aggregator, from at least one of the plurality of client computers; the intermediate global upper-level machine learning model is transmitted, by the aggregator, to at least one of the plurality of client computers; and revised parameters associated with the upper-level system are received, by the aggregator, from at least one of the plurality of client computers.

In one example embodiment, the updated parameters associated with the lower-level system, the revised parameters associated with the lower-level system, the updated parameters associated with the upper-level system and the revised parameters associated with the upper-level system include one or more of the machine learning models, variables associated with the machine learning models, or both.

In one example embodiment, initial global upper-level parameters and initial lower-level parameters are transmitted, by the aggregator, to the plurality of client computers to be used in the initial iteration of the federated learning model training.

In one example embodiment, the assumed ratio of Byzantine clients associated with the lower-level system to non-Byzantine clients associated with the lower-level system is transmitted by the aggregator. It is worth noting that in one or more embodiments, the client(s) does/do not necessarily use the ratio. Rather, this is more in the sense that all clients agree with this assumed ratio to be used by the aggregator for aggregating the hypergradients.

In one example embodiment, a first upper-level hypergradient is computed, by each of the client computers, using an updated lower-level model, and the first upper-level hypergradient is transmitted to the aggregator.

In one example embodiment, a global upper-level hypergradient is computed, by the aggregator, using the first upper-level hypergradient, and the global upper-level hypergradient is transmitted to at least one of the plurality of client computers.

In one example embodiment, a first lower-level hypergradient is computed, by each of the client computers, using an updated lower-level model, and the first lower-level hypergradient is transmitted to the aggregator.

In one example embodiment, a global lower-level hypergradient is computed, by the aggregator, using the first lower-level hypergradient, and the global lower-level hypergradient is transmitted to at least one of the plurality of client computers.

In one example embodiment, the generating of the intermediate global lower-level machine learning model and the generating of the global lower-level machine learning model are repeated.

In one example embodiment, the generating of the intermediate global upper-level machine learning model and the generating of the global upper-level machine learning model are repeated.

In one example embodiment, the lower-level sets of non-Byzantine clients and a combination of gradients are determined using an aggregation mechanism on first lower-level gradients.

In one example embodiment, the upper-level sets of non-Byzantine clients and a combination of hypergradients are determined using an aggregation mechanism on client first upper-level hypergradients.

In one example embodiment, a machine learning inferencing operation is performed using the global upper-level machine learning model.

In one example embodiment, the performing of the machine learning inferencing operation further comprises detecting a fraudulent financial transaction and mitigating the fraudulent financial transaction. It is worth noting that generally, one or more embodiments can be used where not all the clients are trusted and/or where the communication network between the clients and the aggregator is unstable, and therefore, the received message sent by the clients can be corrupted.

In one aspect, a computer program product comprises one or more tangible computer-readable storage media and program instructions stored on at least one of the one or more tangible computer-readable storage media, the program instructions executable by a processor, the program instructions comprising receiving, by an aggregator, updated parameters associated with a lower-level system from a plurality of client computers; generating, using data from an identified first set of lower-level non-Byzantine client computers, of the plurality of client computers, which are characterized as being non-Byzantine for the lower-level system, an intermediate global lower-level machine learning model by executing federated learning model training and aggregation; generating, using data from an identified second lower-level set of non-Byzantine client computers, of the plurality of client computers, which are characterized as being non-Byzantine for the lower-level system, a global lower-level machine learning model by executing the federated learning model training and aggregation; generating, using data from an identified first upper-level set of non-Byzantine client computers, of the plurality of client computers, which are characterized as being non-Byzantine for an upper-level system, an intermediate global upper-level machine learning model by executing the federated learning model training and aggregation; generating, using data from a second upper-level set of client computers, of the plurality of client computers, which are characterized as being non-Byzantine for the upper-level system, a global upper-level machine learning model by executing the federated learning model training and aggregation; and transmitting, by the aggregator, the global upper-level machine learning model to at least one of the plurality of client computers.

In one aspect, an apparatus comprises a memory and at least one processor, coupled to the memory, and operative to perform operations comprising receiving, by an aggregator, updated parameters associated with a lower-level system from a plurality of client computers; generating, using data from an identified first set of lower-level non-Byzantine client computers, of the plurality of client computers, which are characterized as being non-Byzantine for the lower-level system, an intermediate global lower-level machine learning model by executing federated learning model training and aggregation; generating, using data from an identified second lower-level set of non-Byzantine client computers, of the plurality of client computers, which are characterized as being non-Byzantine for the lower-level system, a global lower-level machine learning model by executing the federated learning model training and aggregation; generating, using data from an identified first upper-level set of non-Byzantine client computers, of the plurality of client computers, which are characterized as being non-Byzantine for an upper-level system, an intermediate global upper-level machine learning model by executing the federated learning model training and aggregation; generating, using data from a second upper-level set of client computers, of the plurality of client computers, which are characterized as being non-Byzantine for the upper-level system, a global upper-level machine learning model by executing the federated learning model training and aggregation; and transmitting, by the aggregator, the global upper-level machine learning model to at least one of the plurality of client computers.

In one example embodiment, an inner loop of federated learning model training includes computing an upper-level hypergradient at each client computer and sending the upper-level hypergradients to the aggregator; computing an aggregated upper-level hypergradient at the aggregator and sending the aggregated upper-level hypergradient to the client computers; updating a local upper-level model at each client computer and sending the updated local upper-level model to the aggregator; creating a global upper-level model at the aggregator; and sending the created global upper-level model to the client computers.

In one example embodiment, an outer loop of federated learning model training includes computing a lower-level hypergradient at each client computer and sending the lower-level hypergradients to the aggregator; computing an aggregated lower-level hypergradient at the aggregator and sending the aggregated lower-level hypergradient to the client computers; updating a local lower-level model at each client computer and sending the updated local lower-level model to the aggregator; creating a global lower-level model at the aggregator; and sending the created global lower-level model to the client computers.

Figure 13:
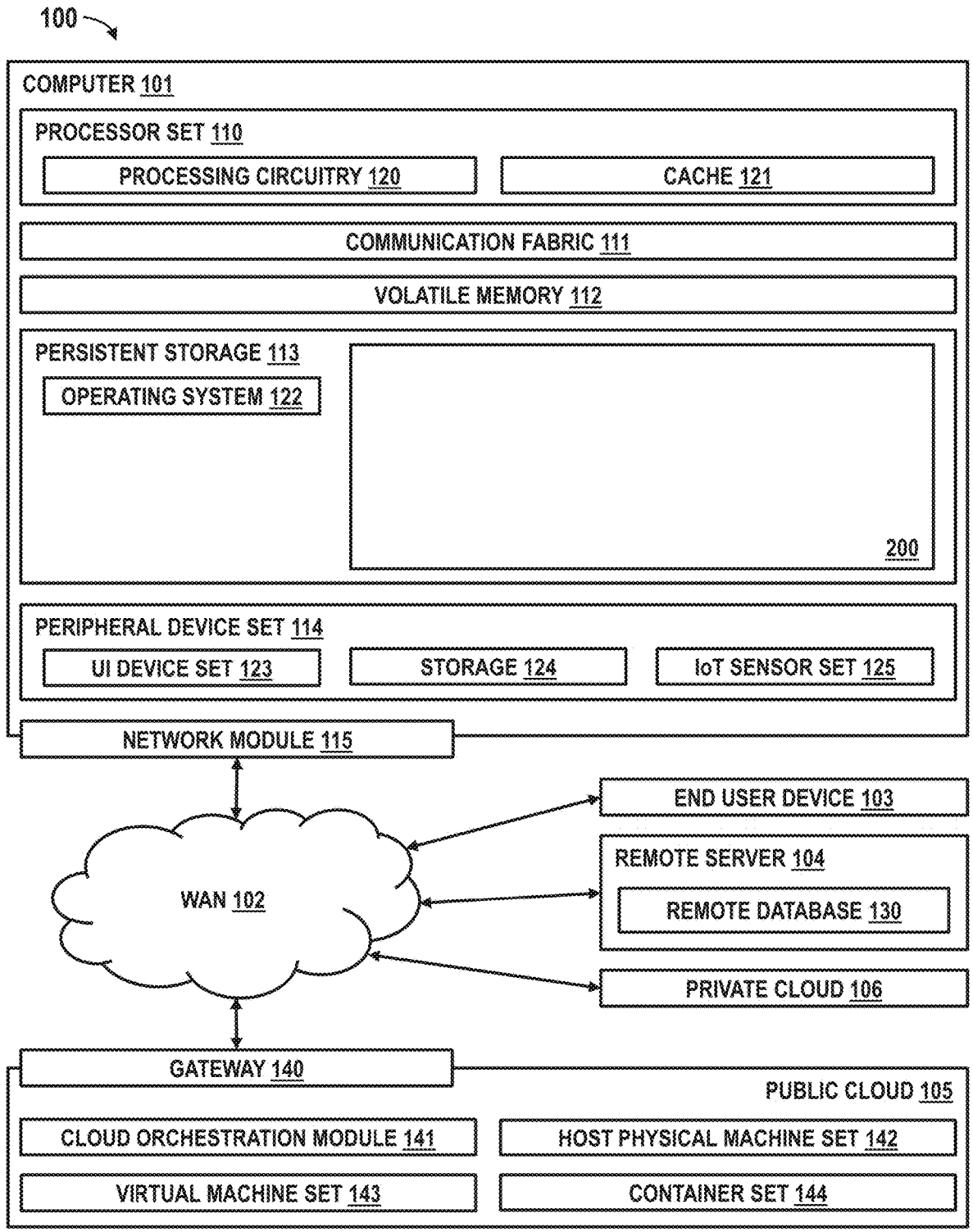
FIG. 13 depicts a computing environment according to an embodiment of the present invention.

Refer now to FIG. 13.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as federated learning aggregator 200 (also generally representative of a federated learning client). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 13. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for defending against Byzantine attacks in a federated learning system, the method comprising:
   receiving, by an aggregator, from a plurality of client computers, updated parameters associated with a lower-level system;
   generating, using data from an identified first set of lower-level non-Byzantine client computers, of the plurality of client computers, which are characterized as being non-Byzantine for the lower-level system, an intermediate global lower-level machine learning model, by executing federated learning model training;
   generating, using data from an identified second lower-level set of non-Byzantine client computers, of the plurality of client computers, which are characterized as being non-Byzantine for the lower-level system, a global lower-level machine learning model, by executing the federated learning model training;
   generating, using data from an identified first upper-level set of non-Byzantine client computers, of the plurality of client computers, which are characterized as being non-Byzantine for an upper-level system, an intermediate global upper-level machine learning model, by executing the federated learning model training;
   generating, using data from a second upper-level set of client computers, of the plurality of client computers, which are characterized as being non-Byzantine for the upper-level system, a global upper-level machine learning model, by executing the federated learning model training; and
   transmitting, by the aggregator, the global upper-level machine learning model to at least one of the plurality of client computers.

2. The computer-implemented method of claim 1, further comprising:
   transmitting, by the aggregator, the intermediate global lower-level machine learning model to at least one of the plurality of client computers;
   receiving, by the aggregator, revised parameters associated with the lower-level system from at least one of the plurality of client computers;
   transmitting, by the aggregator, the global lower-level machine learning model to at least one of the plurality of client computers;

receiving, by the aggregator, updated parameters associated with the upper-level system from at least one of the plurality of client computers;

transmitting, by the aggregator, the intermediate global upper-level machine learning model to at least one of the plurality of client computers; and receiving, by the aggregator, revised parameters associated with the upper-level system from at least one of the plurality of client computers.

3. The computer-implemented method of claim 2, wherein the updated parameters associated with the lower-level system, the revised parameters associated with the lower-level system, the updated parameters associated with the upper-level system and the revised parameters associated with the upper-level system include one or more of the machine learning models, variables associated with the machine learning models, or both.

4. The computer-implemented method of claim 1, further comprising transmitting, by the aggregator, initial global upper-level parameters and initial lower-level parameters to the plurality of client computers to be used in the initial iteration of the federated learning model training.

5. The computer-implemented method of claim 1, further comprising the aggregator transmitting, to the plurality of client computers, the assumed ratio of Byzantine clients associated with the lower-level system to non-Byzantine clients associated with the lower level system.

6. The computer-implemented method of claim 1, further comprising computing, by each of the client computers, a first upper-level hypergradient using an updated lower-level model, and transmitting the first upper-level hypergradient to the aggregator.

7. The computer-implemented method of claim 6, further comprising computing, by the aggregator, a global upper-level hypergradient using the first upper-level hypergradient, and transmitting the global upper-level hypergradient to at least one of the plurality of client computers.

8. The computer-implemented method of claim 1, further comprising computing, by each of the client computers, a first lower-level hypergradient using an updated lower-level model, and transmitting the first lower-level hypergradient to the aggregator.

9. The computer-implemented method of claim 8, further comprising computing, by the aggregator, a global lower-level hypergradient using the first lower-level hypergradient, and transmitting the global lower-level hypergradient to at least one of the plurality of client computers.

10. The computer-implemented method of claim 1, further comprising repeating the generating the intermediate global lower-level machine learning model and the generating the global lower-level machine learning model.

11. The computer-implemented method of claim 1, further comprising repeating the generating the intermediate global upper-level machine learning model and the generating the global upper-level machine learning model.

12. The computer-implemented method of claim 1, further comprising determining the lower-level sets of non-Byzantine clients and a combination of gradients using an aggregation mechanism on first lower-level gradients.

13. The computer-implemented method of claim 1, further comprising determining the upper-level sets of non-Byzantine clients and a combination of hypergradients using an aggregation mechanism on client first upper-level hypergradients.

14. The computer-implemented method of claim 1, further comprising performing a machine learning inferencing operation using the global upper-level machine learning model.

15. The computer-implemented method of claim 14, wherein the performing of the machine learning inferencing operation further comprises detecting a fraudulent financial transaction and mitigating the fraudulent financial transaction.

16. A computer program product, comprising:
one or more tangible computer-readable storage media and program instructions stored on at least one of the one or more tangible computer-readable storage media, the program instructions executable by a processor, the program instructions comprising:
receiving, by an aggregator, from a plurality of client computers, updated parameters associated with a lower-level system;
generating, using data from an identified first set of lower-level non-Byzantine client computers, of the plurality of client computers, which are characterized as being non-Byzantine for the lower-level system, an intermediate global lower-level machine learning model, by executing federated learning model training;
generating, using data from an identified second lower-level set of non-Byzantine client computers, of the plurality of client computers, which are characterized as being non-Byzantine for the lower-level system, a global lower-level machine learning model, by executing the federated learning model training;
generating, using data from an identified first upper-level set of non-Byzantine client computers, of the plurality of client computers, which are characterized as being non-Byzantine for an upper-level system, an intermediate global upper-level machine learning model, by executing the federated learning model training;
generating, using data from a second upper-level set of client computers, of the plurality of client computers, which are characterized as being non-Byzantine for the upper-level system, a global upper-level machine learning model, by executing the federated learning model training; and
transmitting, by the aggregator, the global upper-level machine learning model to at least one of the plurality of client computers.

17. A system comprising:
a memory; and
at least one processor, coupled to said memory, and operative to perform operations comprising:
receiving, by an aggregator, from a plurality of client computers, updated parameters associated with a lower-level system;
generating, using data from an identified first set of lower-level non-Byzantine client computers, of the plurality of client computers, which are characterized as being non-Byzantine for the lower-level system, an intermediate global lower-level machine learning model, by executing federated learning model training;
generating, using data from an identified second lower-level set of non-Byzantine client computers, of the plurality of client computers, which are characterized as being non-Byzantine for the lower-level system, a global lower-level machine learning model, by executing the federated learning model training;

generating, using data from an identified first upper-level set of non-Byzantine client computers, of the plurality of client computers, which are characterized as being non-Byzantine for an upper-level system, an intermediate global upper-level machine learning model, by executing the federated learning model training;

generating, using data from a second upper-level set of client computers, of the plurality of client computers, which are characterized as being non-Byzantine for the upper-level system, a global upper-level machine learning model, by executing the federated learning model training; and transmitting, by the aggregator, the global upper-level machine learning model to at least one of the plurality of client computers.

18. The system of claim 17, the operations further comprising:

transmitting, by the aggregator, the intermediate global lower-level machine learning model to at least one of the plurality of client computers;

receiving, by the aggregator, revised parameters associated with the lower-level system from at least one of the plurality of client computers;

transmitting, by the aggregator, the global lower-level machine learning model to at least one of the plurality of client computers;

receiving, by the aggregator, updated parameters associated with the upper-level system from at least one of the plurality of client computers;

transmitting, by the aggregator, the intermediate global upper-level machine learning model to at least one of the plurality of client computers; and receiving, by the aggregator, revised parameters associated with the upper-level system from at least one of the plurality of client computers.

19. The system of claim 17, the operations further comprising determining the lower-level sets of non-Byzantine clients and a combination of gradients using an aggregation mechanism on first lower-level gradients.

20. The system of claim 17, the operations further comprising determining the upper-level sets of non-Byzantine clients and a combination of hypergradients using an aggregation mechanism on client first upper-level hypergradients.

* * * * *